United States Patent [19]

Johanson et al.

[11] 4,242,716
[45] Dec. 30, 1980

[54] DIFFERENTIAL DISC CAPACITOR

[75] Inventors: John E. Johanson; Norman E. Johanson, both of Boonton, N.J.

[73] Assignee: Johanson Manufacturing Corporation, Boonton, N.J.

[21] Appl. No.: 23,560

[22] Filed: Mar. 26, 1979

[51] Int. Cl.³ .............................................. H01G 5/06
[52] U.S. Cl. ................................... 361/299; 361/293; 361/298
[58] Field of Search ............... 361/292, 293, 298, 299; 334/82, 78

[56] References Cited

U.S. PATENT DOCUMENTS

| 3,701,932 | 10/1972 | Johanson | 361/293 X |
| 4,095,263 | 6/1978 | Johanson | 362/292 |
| 4,112,480 | 9/1978 | Johanson | 361/293 X |

Primary Examiner—E. A. Goldberg
Attorney, Agent, or Firm—Pennie & Edmonds

[57] ABSTRACT

A tunable differential disc capacitor having a pair of outer dielectric discs and an electrically conductive rotor element, plural paired electrically conductive portions disposed on the respective dielectric discs and spring clamp means electrically and mechanically connected to respective pairs of the conductive portions. A preferred embodiment has three such pairs of conductive portions and a corresponding number of spring clamp means, so that the rotor element can be moved to various positions with respect to the conductive portions, varying the capacitance values. Electrical connection can be made to a spring clamp connected to the rotor element and to either or both of the other spring clamps, thereby obtaining one or two trimmable differential capacitors. The device can be used with the capacitors connected in series or in parallel. A sealed housing is also provided.

22 Claims, 8 Drawing Figures

DIFFERENTIAL DISC CAPACITOR

FIELD OF THE INVENTION

This invention relates to trimmable, tunable, variable or adjustable capacitors and is directed particularly to improvements in the structure of trimmable capacitors whereby the capacitor has a movable rotor and a plurality of opposed stators positioned such that the rotor may partially or fully overlap one or more stators to provide a differential capacitance between two parts of a circuit. In a second embodiment, the differential capacitor is fully sealed against the penetration of gases, dust or other contaminants and yet is trimmable over its entire range from the exterior of its package without breaking or otherwise impairing the effectiveness of the seal.

DESCRIPTION OF THE PRIOR ART

This invention is an improvement of the structure and housing of the variable disc capacitor taught by U.S. Pat. No. 3,701,932, issued to the same inventor. It also relates in general to U.S. Pat. Nos. 4,095,263 and 4,112,480, assigned to the same assignee and to U.S. patent application Ser. No. 934,357.

In the present invention, the capacitor of U.S. Pat. No. 3,701,932 has been miniaturized and altered in its structure to provide a differential capacitor for balancing two electrical circuits, to provide a series-parallel capacitor and to provide two independent capacitors within a single unit, as well as to fit into a sealed housing. It shares many of the design improvements of the capacitor disclosed in U.S. Pat. No. 4,095,263 except for the construction of the sealed housing.

The present invention affords the opportunity of providing more than one capacitor in substantially the space occupied previously by a single capacitor of the type described above, thus providing a significant advantage to the art, as well as other benefits.

OBJECT OF THE INVENTION

An object of the present invention is to provide a miniature trimmable or variable differential capacitor which may be fully enclosed within a sealed housing such that air, gases, moisture, dust, or other contaminants cannot enter or penetrate the sealed package without breaking the seal or otherwise impairing its effectiveness.

Another object of the invention is to provide a variable differential capacitor device comprising plural capacitor elements that can be selected.

Another object of this invention is to provide a compact, trimmable differential capacitor which is stable in performance with respect to temperature changes, physical shock and other environmental factors.

Another object of this invention is to provide a miniature differential disc capacitor with these features which is easily trimmable with a square tuning tool made of a dielectric material so as not to introduce strays into the circuit while tuning.

SUMMARY OF THE INVENTION

The trimmable differential capacitor of the present invention includes a first stator ceramic disc having plural spaced patterns of conductive material, such as metallic layers, on its lower side, a generally semicircular rotor member, and a second stator disc having corresponding metallic layers located on its upper side and generally juxtaposed with the metallic layers or patterns of the first stator disc. The stator discs and rotor are all retained in a stacked relation and held in position by spring clamps, two of said clamps being upward vertical extensions of the respective stator leads described below and the other spring clamp being an upward extension of the rotor lead described below, the entire capacitor assembly being capable of fitting within the upper cylindrical housing member described below, if a sealed unit is desired.

The rotor member is a thin substantially semi-circular metallic plate having a central concentric cylindrical post portion, the upper end of which is provided with a square adjusting hole or recess. The lower end of the rotor post portion is formed with a concentric circular recess. The ceramic dielectric stator discs are provided with round central openings for the sliding reception of the upper and lower ends of the rotor post portion. The inner diameter of the stator discs must be greater than the diameter of the rotor post portion so that the stators will be insulated from the rotor.

First and second spring clamp electrodes serve not only to clamp the disc-like parts of the tunable capacitor together, but also to electrically interconnect each vertical set of stators together to act as two separate stators between which may be sandwiched the semi-circular rotor member. The first two spring clamp members are disposed generally opposite each other and each of these first spring clamp members is integrally formed with upper clamp finger portions extending into a bifurcated portion, a central vertical portion, a base portion, and an offset leg portion extending downward from said base portion. The finger portions are bent downwards to provide a spring clamp.

The other, or third, spring clamp electrode also serves to resiliently clamp the disc-like parts of the trimmable differential capacitor together at a point generally between said first spring clamps. This third electrode clamp has a flat base portion formed with a pair of central inwardly extending spring fingers terminating upwardly and outwardly into the central recess of the lower rotor post portion to make electrical contact therewith. The outer ends of the base portion are integrally formed with a vertical portion, best spring finger portions and a central downwardly and outwardly extending leg portion. The rotor, ceramic stator discs and spring clamp members form the basic tunable capacitor assembly and may be made in any of a plurality of known means including those disclosed in U.S. Pat. Nos. 3,701,932 and 4,095,263.

The tunable trimmable differential capacitor of the present invention may be inserted into a sealed housing, said housing having two parts, the first part being an inverted open cylindrical structure having a top and cylindrical sides with a centrally disposed circular opening in the top. The other part of the housing is a base member of generally circular shape which is friction fitted within the base opening of the cylindrical wall of the upper housing member. The base member of the housing has three small rectangular portions of its perimeter cut away to permit the stator rotor leads to protrude outside the housing itself, two of which are diametrically opposed to receive the stator leads and the third of which is disposed between the opposed two rectangular portions. The housing is make of a slightly flexible plastic material such as Delrin (Trademark).

The upper housing member is cylindrically shaped having integrally formed top and side walls and an open base. The top of the upper housing member has a centrally located circular opening having a diameter slightly less than the outer diameter of the upper post portion of the rotor which is friction-fitted into this opening such that its top is slightly recessed within the top of the upper housing member, thereby forming an airtight seal around the rotor post while still permitting the tuning tool to be inserted in the upper square recess of the rotor post. The base of the housing is a circular, washer-type member having an outer diameter slightly greater than inner diameter of the base of the cylindrical upper housing member. It also has the three said small rectangular portions cutaway at its perimeter to receive the downward-extending leg portions of the spring clamp leads. After the tunable capacitor assembly is inserted into the upper housing member with the upper portion of the rotor post friction fitted into the top, base housing member is coated around its bottom periphery with an epoxy glue and friction fitted into the base of the cylindrical upper housing member such that the bottom of the lower housing member is recessed slightly within the base of the cylindrical wall of the upper housing member. The epoxy is positioned to seal the spring clamp leads in their respective openings through the base member. The difference in diameters of the housing members also contributes to the tightness of the base seal. Thus, the tunable capacitor assembly is completely sealed within a strong, semi-rigid plastic housing have a recess at its top to permit the use of a tuning tool. All seals, whether friction fitted or friction fitted and glued are so tight that no moisture, dust or other contaminants can enter the housing and affect the trimmable differential capacitor assembly.

The trimmable differential capacitor has two stator leads and one rotor lead. By connection of two or three of these leads, positioning of the rotor, and the shapes of the rotor and stator patterns, a variety of capacitors may be obtained. Connecting only the two stator leads yields a variable capacitor. Connecting the rotor and both stators yields 2 variable capacitors which then can serve as a differential capacitor to balance two circuits. The opposed stator patterns need not be identical in size and shape. The rotor can be of any known shape such as butterfly, semicircular, parabolic or other shape.

PREFERRED EMBODIMENTS

Figure 1:
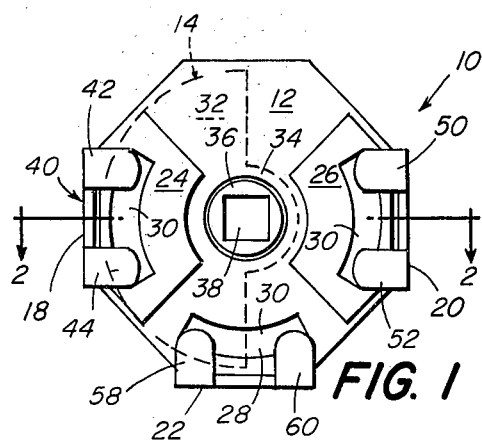
FIG. 1 is a top view of the preferred embodiment of a trimmable differential capacitor embodying the invention.
Figure 2:
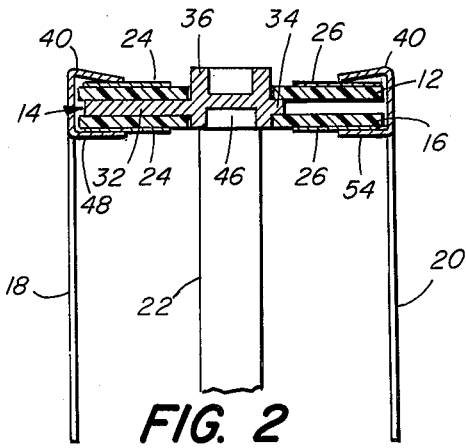
FIG. 2 is a vertical cross-sectional view thereof taken along the line 2—2 of FIG. 1, in the direction of the arrows.
Figure 3:
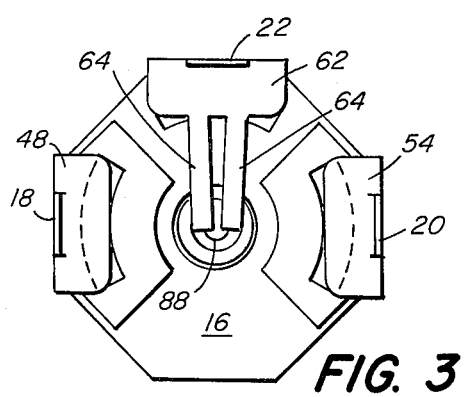
FIG. 3 is a bottom view of the capacitor shown in FIG. 1.

Referring now in detail to the drawings, and considering first the embodiment of the invention illustrated in FIGS. 1, 2 and 3, the trimmer differential capacitor, generally indicated by reference numeral 10, comprises a first stator disc 12, a generally semi-circular rotor member 14, and a second stator disc 16, all retained in face-to-face, stacked relation in that order by formed sheet metal spring clamps 18, 20, and 21, (A,B,C, in FIG. 4) The vertical extension of clamp 22 is not shown, the upper side of the first stator disc 12 and the underside of the second stator disc 16, which disc will preferably be fabricated of a ceramic (e.g., a dielectric constant with typical K factors of about 6 to 220) are each provided with generally arcuate highly-conductive metallic coatings 24, 26, 28. The upper stator disc 12 is of identical construction to that of the lower stator disc member 16, but is placed so that its conductive layers 24, 26, and 28 face upwardly, or to the outside as illustrated in the drawing. Conductive layer 28 is obscured by solder layer 30 in FIG. 1. The respective conductive layers 24, 26, 28 of each stator disc 12, 16 can be generally of the same shape, with which they are generally juxtaposed. However, such opposed coatings 24, 26, 28 need not be identical in shape or size. Each of the conductive layers 24, 26, 28 can have a solder pattern 30 disposed thereon, such solder patterns providing a bond between the respective conductive layers 24, 26, 28 and their associated spring clamps 18, 20, 22.

Figure 8:
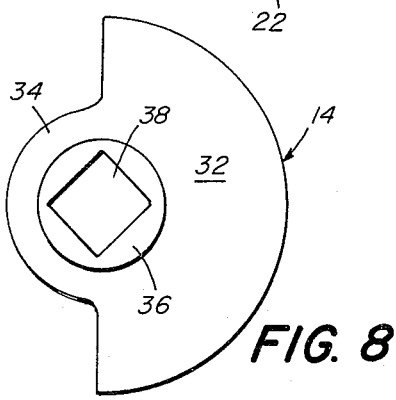
FIG. 8 is a top view of the preferred embodiment rotor element of the device of the present invention as illustrated in FIG. 1.

The rotor member 14, which is preferably integrally formed of coin silver, or similar highly-conductive material, comprises a thin, generally semi-circular rotor plate portion 32 having a collar portion 34 (FIG. 8) within which there is disposed a central, concentric cylindrical post portion 36 the upper end of which is provided with a square adjusting hole or recess 38. The lower end of the post portion 36 of the rotor member 14 can be formed with a concentric circular recess 46 (see FIG. 2), for the purpose hereinafter appearing. Stator disc members 12 and 16 are provided with round central openings respectively, for the sliding reception of the lower and upper ends of the post portion 36 of the rotor member 14 upon assembly. It is to be noted that the inner diameter of the metal coatings 24, 26, and 28 of the first and second stator discs 12 and 16 are somewhat greater than the diameter of post portion 36 of the rotor 14, so that said stator discs will remain electrically insulated from the rotor member 14 upon assembly of the capacitor.

A first spring clamp electrode 18, which may also be of coin silver, beryllium copper or similar spring temper highly-conductive material, serves not only to resiliently clamp the disc-like parts of the differential capacitor 10 together, but also to electrically interconnect the conductive layers 24 and of the stator disc members 12 and 16 to act as a single electrical stator between which may be sandwiched or positioned the semi-circular rotor member 14. To this end, the first spring clamp electrode 18 is formed with an upper clamp finger portion 40 extending into a bifurcated portion defining laterally-spaced leg portions 42, 44. Clamp electrode 18 further comprises an engaging portion 48 (FIGS. 2 and 3) that is, preferably, generally plateshaped and oppositely disposed to leg portions 42, 44 and preferably is generally co-extensive therewith in a lateral direction. Spring clamp electrode 20 is disposed generally opposite, e.g., diametrically opposite, the first spring clamp electrode 18 and comprises leg portion 50, 52 and an engaging portion 54 that are similar to the corresponding elements of spring clamp electrode 18. In the embodiment shown in FIGS. 1–3, the leg portions 42, 44 and 50, 52 of the respective spring clamp electrodes 18, 20 contact the upper conductive layers 24, and 26, respectively, and the engaging portions 48 and 54 contact the lower conductive layers 24 and 26 respectively. It is preferred that such contacts be soldered or otherwise bonded, as by solder areas 30, for example.

The trimmer capacitor device 10 further includes the third spring clamp electrode 22 which, also, comprises leg portions 58, 60 that engage metallic coating, or area, 28 and engaging portion 62 that engages lower metallic coating 28. The spring clamp electrode 22 also includes a bifurcated extension 64, as described below. The metallic 24, 26, 28 areas can be generally arcuate, and metallic areas or patterns 28 can be smaller in size than the others, as shown.

Figure 5:
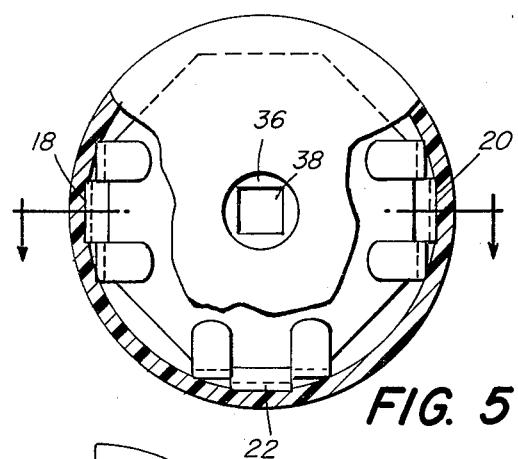
FIG. 5 is a partially cut-away top view of the device shown in FIG. 1, within the housing or package therefor.

The device 10 can further include a housing that includes a generally cup-shaped receptacle portion 70 (FIGS. 5–7) and a cover or base member 72 (FIG. 7) as described hereinafter.

Since the lower electrically-conducting layer 24 of the lower stator disc member 16 is in electrical contact with the engaging portion 48 and upper metallic layer 24 is in electrical contact with the laterally-spaced leg portions 42, 44 of the spring clamp electrode 18, the upper and lower conductive layers or plates 24 of the stator assembly 12, 16 are both electrically connected to said clamp electrode 18 so that the tab portion thereof can serve as a common stator connector terminal for the assembled trimmer capacitor. To enhance the electrical and mechanical connection between the lower stator disc members 12 and 16 and the spring clamp electrode 18, portions 42, 44 and 48 of said clamp electrode 18 are preferably spot soldered or welded to the respective upper and lower conductive layers 24 of said stator members, as indicated by solder areas 30 in FIGS. 1 and 3.

The spring clamp electrodes 20 and 22, which are also preferably formed with coin silver, beryllium copper or similar spring temper highly-conductive material, serve also to resiliently clamp the disc-like parts of the adjustable capacitor together, electrode 20 at a side portion thereof diametrically opposite the electrode 18 and electrode 22 between electrodes 18 and 20, with electrode 22 making electrical connection with the rotor member 34. To this end, the spring clamp electrode 22 (FIG. 3) is formed with a transversely-extending flat base portion 62 integrally formed with a pair of central, inwardly-extending brush contacts 88, respectively, adapted to project upwardly into the circular recess 46 of the post portion 36 comprising the rotor disc 34 to make electrical contact with the bottom and side inner surface of said recess. The outer ends of the flat base portion 62 of the spring clamp electrode 22 is also integrally formed with the central, downwardly and outwardly-extending leg portion of 22, which, upon assembly of the trimmer capacitor, is adapted to fit through slot 76 in the base member 72, which slot is between slots 74, 78, therein. As illustrated in FIGS. 1, 2, and 3, the spring finger portions of the various spring clamp electrodes 18, 20, 22, resiliently abut conductive upper surface portions of both the upper and lower stator disc members 12, 16 to further enhance the retention of the assembled parts in their proper positions. The square slot 38 in the upper end of the post portion 36 of the rotor member 34 provides for the use of a screw driver-like dielectric tool having a bit of complementary square cross-sectional shape for turning said rotor with respect to the rest of the assembly and thereby varying or adjusting capacitance.

In this connection it will be noted that as the rotor is thus turned, the rotor plate portion 32 (FIG. 8) thereof will gradually be moved rotatively outwardly from between the registering pairs of metallic layers or plates 24 or 26 or 28 or the relatively fixed stator disc members 12, 16 so as to correspondingly vary trimmer capacitance. The leg portion of the spring clamp electrode 22 is utilized as a connector terminal by means of which electrical connection is made with the rotor member 34 through the spring finger portion 64, which connect the engaging portion 62 and the brush contacts 88 located in the circular recess 46, as described above. When the rotor disc plate portion 32 is disposed between paired plates 24, on the one hand, and 28, on the other hand, the result is a first variable capacitor (the capacitance value depending on the relative position of the plate portion), while the disposition of the plate portion 32 between paired plates 24 and plates 28 results in another variable capacitor.

It is to be understood that, for clarity of illustration, the trimmer capacitor herein above described is illustrated in greatly increased size. The design, however, lends itself particularly well to extremely compact construction, consistant with economy of manufacture, stability of operation and quality of electrical characteristics. Capacity ranges of, e.g., between 1.0 to 8 pF and 5.0 to 40 pF can readily be achieved in units measuring about one-sixteenth of an inch in height or thickness and a diameter of about 0.195 inches.

The spring clamp stator electrodes 18, 20 serve as electrical connection terminals for the capacitor, and capacitance is varied by rotation of the rotor 14 to move the rotor plate 32 (which can be semi-annular as shown or of some other shape, e.g., butterfly shaped) so that its segmental rotor plate portions 32 extend between the stator conductive layer pairs by correspondingly varying amounts, thereby adjustably varying the capacitive coupling between said stator electrode pairs through the conductive rotor plate portion 3. In the operation of the disc capacitor illustrated in FIGS. 1, 2, and 3, a suitable dielectric square bit tool will be used in the rotor adjusting hole or recess 38 to vary capacitance.

Figure 4:
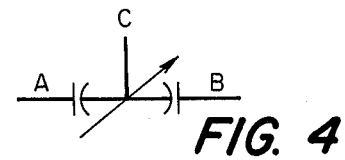
FIG. 4 is a schematic diagram of the capacitor of FIG. 1.

It can be seen that because the presently disclosed capacitor device comprises three separate common terminals (e.g., 18, 20, 22 in FIG. 1) that are mechanically attached to the assembly and electrically connected with the stator discs, as explained herein above, the device comprises two capacitors, to wit., if electrical connection is made to terminals 18 and 22, there results a first capacitor, whereas, if terminals 20 and 22 are electrically connected to respective electrical leads, there results a second capacitor. Where electrical connections are made to terminals 18 and 20, a third capacitor can be provided. Hence there are three possible capacitors from which to choose, namely those formed by connecting electrodes 18 and 22, or 18 and 20, or 20 and 22. A differential capacitor is formed by connecting terminals 18, 20, 22. Each of the capacitors has a predetermined capacitance value designed into the same physical sized component as a prior art single capacitor of this type, thus providing space savings and other benefits. By turning the rotor of the device, the capacitance of both of the above capacitors can be adjusted simultaneously. The circuits are illustrated in FIG. 4.

Figure 6:
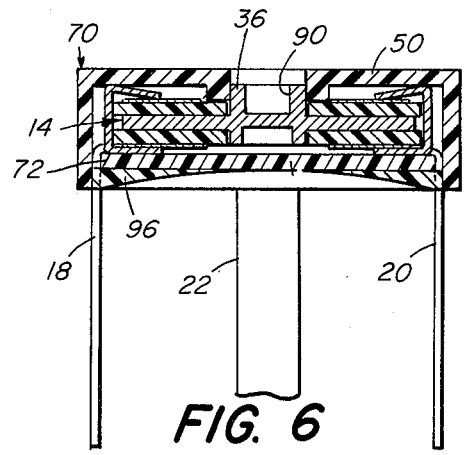
FIG. 6 is a sectional elevation view of the device in FIG. 4 along the axis 6—6 of the device shown in FIG. 1.
Figure 7:
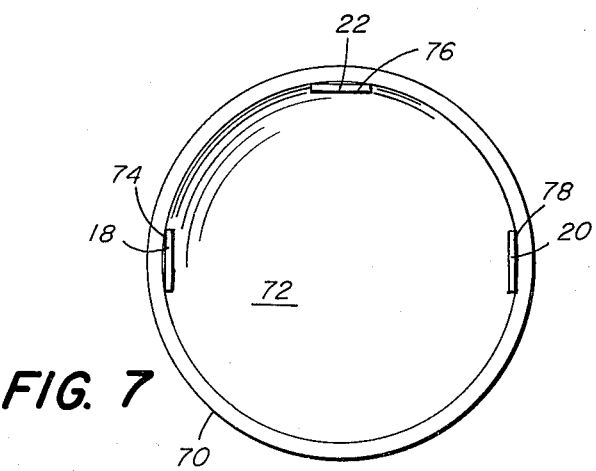
FIG. 7 is a bottom view of the device in FIGS. 5 and 6.

Sealed tunable capacitor 10 may be included in the cylindrical insulated housing having an upper housing, or receptacle, portion 70 (FIGS. 5–7) and a lower housing, or cover, base 72 (FIG. 7). Both housing members 70, 72 are preferable fabricated from a tough semi-rigid plastic material such as Delrin (trademark). The receptacle portion 70 can be generally cup-shaped. The receptacle portion 70 and cover element preferably are of circular configuration and of a tough synthetic plastic material, such as "TEFLON", for example. The circular insulating base member 72 is provided with peripherally disposed through slots 74, 76, 78 through which the connecting tab or leg portions of clamp electrodes 18, 20, 22 (FIG. 1) extend and are available for electrical connection. The device 10 is disposed in the receptacle portion 70, between it and the base member 72.

After the capacitor unit has been assembled as described above it is inserted within upper housing member 70. As illustrated in FIG. 4, the top of upper housing member 70 has a centrally disposed circular opening 90 having a diameter slightly less than the outside diameter of upper rotor post 36. In the assembly of dealed tunable capacitor 10, the top of rotor post 36 is friction-fitted within opening 90 such that it is slightly recessed within the housing top and is tightly sealed therein. This friction fitting makes possible access to tuning recess 38 from the exterior of housing 70 without breaking or otherwise impairing the seal. Base housing member 72, illustrated in FIGS. 6 and 7 has an outside diameter slightly greater than the inside diameter of upper housing member 70 such that base housing member 72 may be friction fitted within upper housing member 70 to form the base of a sealed tunable capacitor 10, as illustrated in FIG. 6. Base housing member 72 is further sealed to upper housing member 70 and the capacitor by a coating 96 of an epoxy glue, such as a nylon-bodied calcium chloride-ethanol, to ensure an air, moisture and dust tight seal. The contour of the base epoxy seal 96 generally is illustrated in FIG. 6, where it is shown as a miniscus near the periphery of the assembly.

Thus, housing 70 provides a completely sealed housing for the tunable capacitor assembly with complete protection against the undesired entry of any contaminant.

While we have illustrated and described herein only one embodiment of my invention, it is to be understood that this is given by way of example only and not in a limiting sense. The invention, in brief, comprises all the embodiments and modifications coming within the scope and spirit of the following claims.

I claim:
1. A tunable differential disc capacitor, comprising:
 (a) a pair of outer dielectric discs comprising respective central openings and outwardly facing first surfaces;
 (b) an electrically conductive rotor element interposed between said discs in face-to-face relation therewith;
 (c) plural electrically conductive portions disposed on each of said dielectric disc first surfaces, said conductive portions of one of said dielectric discs being in substantial spaced parallel registration with said conductive portions of the other of said dielectric discs, so as to provide paired conductive portions;
 (d) spring clamp means for retaining said outer dielectric discs in mutually substantially fixed relation and in face-to-face stacked relation with respect to said rotor element;
 (e) said rotor comprising a flat segmental rotor plate portion and means constraining said rotor to coaxial rotative movement with respect to said dielectric discs;
 (f) said spring clamp means comprising first and second spring clamp electrode members that each comprise a base portion and a clamp finger portion, said base portions of said first and second said electrode members being electrically and mechanically connected with, respectively, first and second said conductive portions of one of said dielectric discs, said clamp finger portions of said first and second said electrode members being electrically and mechanically connected with, respectively, first and second said conductive portions of the other of said dielectric discs, said first and second conductive portions of said one dielectric disc being in substantial registry with said first and second conductive portions of said other dielectric disc
 (g) said spring clamp means further comprising a third electrically conductive spring clamp electrode member that includes a base portion that is electrically and mechanically connected with a third said conductive portion of said one dielectric disc, said third electrically conductive spring clamp electrode member further comprising spring contact means connected to said base portion and electrically contacting a central portion of said rotor element at the region of said central opening of said one dielectric disc, said third spring clamp electrode member also comprising clamp finger portions electrically and mechanically connected with a third said conductive portion of said other dielectric disc, said respective third conductive portions of said dielectric discs being in substantial registry with each other;
 (h) said rotor element comprising a central post portion integrally formed with said segmental rotor plate portion, said central post portion comprising a first axially outwardly-extending portion rotatively journaled in said opening of said one dielectric disc and a second outwardly-extending portion rotatively journaled in said opening of said other dielectric disc, said spring contact means electrically contacting said first axially outwardly-extending portion of said central post portion.

2. A tunable differential disc capacitor as recited in claim 1, wherein said segmental rotor plate portion of said rotor element is generally semi-circular in shape.

3. A tunable differential disc capacitor as recited in claim 2, wherein said central post portion and said segmental rotor plate portion are separate parts integrally connected to each other to provide a unitary structure, said segmental rotor plate portion comprising a collar portion within which said central post portion is disposed.

4. A tunable differential disc capacitor as recited in claim 1, wherein said electrically conductive portions are generally arcuate in shape.

5. A tunable differential disc capacitor as recited in claim 1, wherein said first and second conductive portions are disposed generally opposite each other.

6. A tunable differential disc capacitor as recited in claim 1, wherein said third conductive portions are disposed intermediate said first and second conductive portions.

7. A tunable differential disc capacitor as recited in claim 1, wherein said first and second conductive portions are diametrically opposite each other.

8. A tunable differential disc capacitor as recited in claim 1, wherein said dielectric discs are of ceramic material.

9. A tunable differential disc capacitor as recited in claim 1, wherein said central post portion comprises a circular recess at one end thereof, said spring contact means of said third spring clamp being in electrical contact with said rotor element central portion at said circular recess.

10. A tunable differential disc capacitor as in claim 1, wherein said conductive portions are spaced from said rotor element central post portion.

11. A tunable differential disc capacitor as in claim 1, wherein said clamp finger portions each comprise a bifurcated portion comprising laterally spaced leg portions.

12. A tunable differential disc capacitor as in claim 1, wherein said base portions are generally plateshaped and substantially co-extensive in a lateral direction with said clamp finger portions.

13. A tunable differential disc capacitor as in claim 1, wherein said spring contact means comprise inwardly-extending brush contacts adapted to project into a circular recess of said post portion.

14. A tunable differential disc capacitor as recited in claim 1, wherein said central post portion comprises a square slot at an end thereof, said slot being adapted to receive an adjusting tool, whereby said segmental rotor plate portion can be moved among various positions with respect to said paired conductive portions to adjust the capacitance of said capacitor.

15. A tunable differential disc capacitor as recited in claim 1, wherein said segmental rotor plate is generally butterfly-shaped.

16. A tunable differential disc capacitor as recited in claim 1, further comprising a sealed housing for said capacitor assembly, comprising:

(a) an upper housing member having a generally circular shape including a top and a circular side wall, said top comprising a circular opening having a diameter slightly less than the outside diameter of said rotor post portion, such that one end of said rotor post portion can be frictionally fitted within said opening and recessed within said top to form a friction sealing of said rotor post portion within said upper housing member top, permitting access to said rotor post recess capable of receiving said adjustment tool;

(b) a base housing member to seal said capacitor assembly within said upper housing member, said base housing member having an outside diameter slightly greater than the inside diameter of said upper housing member, such that said base housing member may be friction-fitted within said upper housing member;

(c) said base housing member having three rectangular slots at its periphery to receive the contact leads of said spring clamp members in sealed engagement therewith.

17. A tunable differential disc capacitor as recited in claim 16, wherein said housing members are of a semi-rigid, non-conductive plastic material to permit the friction-fitting sealing of said capacitor assembly within said housing.

18. The sealed tunable capacitor of claim 16, further including: a coating of an epoxy adhesive on the side and bottom of said base housing member to further seal said housing against the penetration of contaminants.

19. The sealed tunable capacitor of claim 18, wherein said epoxy adhesive is a nylon-bodied calcium chloride-ethanol.

20. The sealed tunable capacitor of claim 16, wherein said contact leads are sealed in said rectangular slots by frictional engagement therewith.

21. The sealed tunable capacitor of claim 16, wherein said contact leads are sealed in said rectangular slots by said epoxy adhesive.

22. The sealed tunable capacitor of claim 16, wherein said contact leads are sealed in said rectangular slots by frictional engagement therewith and by said epoxy adhesive.

* * * * *